United States Patent
Zaguroli, Jr. et al.

[11] Patent Number: 5,915,840
[45] Date of Patent: Jun. 29, 1999

[54] LINEAR GUIDEWAY ARRANGEMENT

[75] Inventors: James Zaguroli, Jr., Drayton Plains; James M. Weitz, Waterford; James L. Daubert, Eastpointe, all of Mich.

[73] Assignee: Knight Industries, Inc., Auburn Hills, Mich.

[21] Appl. No.: 08/326,604

[22] Filed: Oct. 20, 1994

[51] Int. Cl.[6] .................................................. F16C 19/00
[52] U.S. Cl. .................................. 384/53; 384/55; 384/58
[58] Field of Search ................................. 384/53, 55, 58

[56] References Cited

U.S. PATENT DOCUMENTS

| | | | |
|---|---|---|---|
| 2,525,712 | 10/1950 | Neighbour | 384/55 |
| 3,375,045 | 3/1968 | Zeidler | 384/58 |
| 3,998,497 | 12/1976 | Koizumi | 384/53 |
| 4,623,201 | 11/1986 | Gallone | 384/53 |
| 4,867,579 | 9/1989 | Gallone | 384/53 |
| 4,878,630 | 11/1989 | Schmid | 384/58 X |

FOREIGN PATENT DOCUMENTS

| | | | |
|---|---|---|---|
| 3013410 | 10/1981 | Germany | 384/53 |
| 3834900 | 4/1990 | Germany | 384/58 |
| 1-242818 | 9/1989 | Japan | 384/58 |

*Primary Examiner*—John Q. Nguyen
*Attorney, Agent, or Firm*—John R. Benefiel

[57] ABSTRACT

A linear guideway arrangement is provided by upper and lower guide bars held in a spaced apart parallel relationship by a series of locator blade pieces having end contours engaging the inside surfaces of the guide bars. Upper and lower rollers sets are mounted to a holder member, the rollers in each set engaging the upper and lower surfaces of the guidebars to provide low friction rolling support for a structure mounted to the holder member.

12 Claims, 2 Drawing Sheets

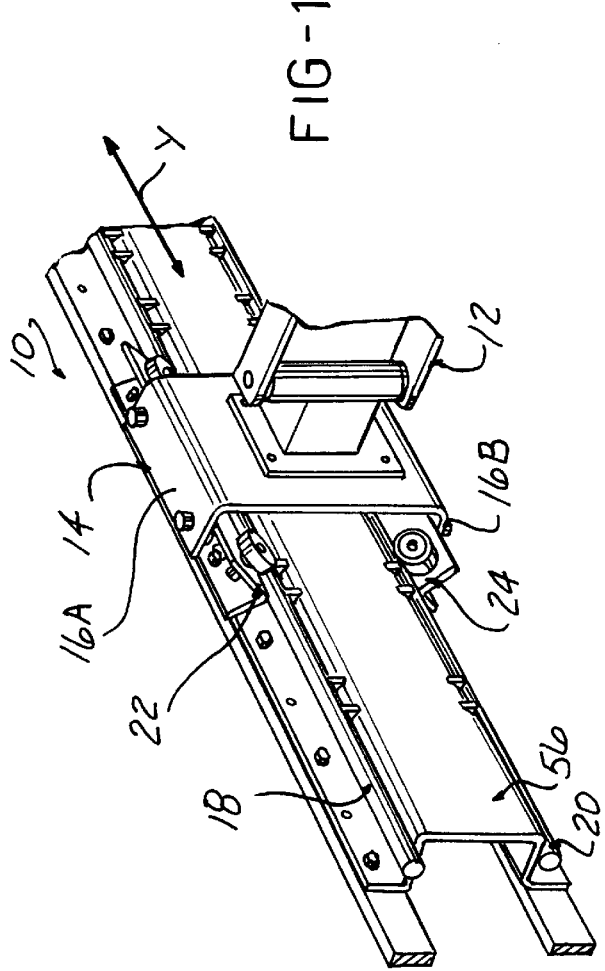
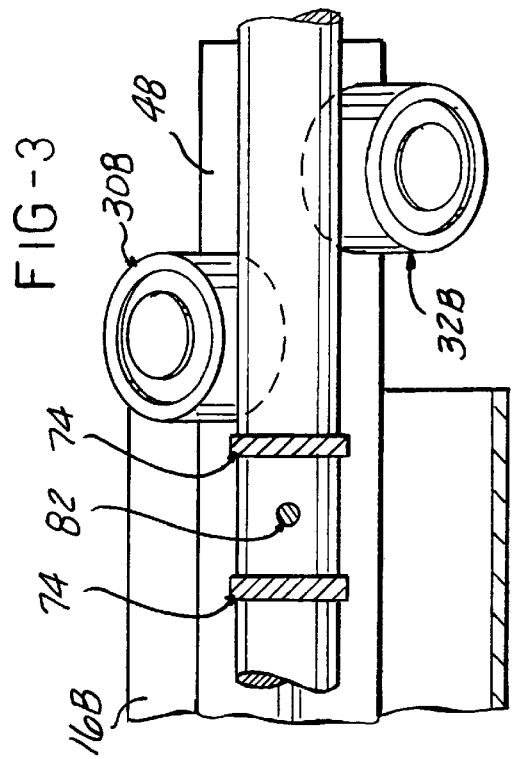
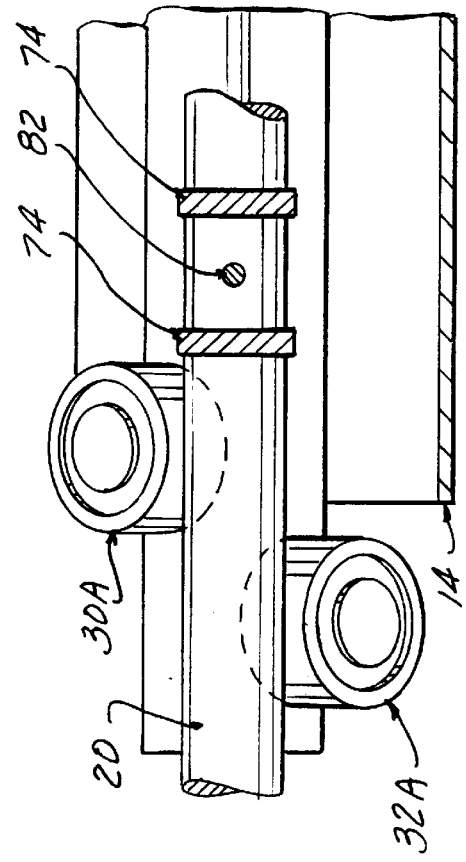

LINEAR GUIDEWAY ARRANGEMENT

FIELD OF THE INVENTION

This invention concerns a guideway for supporting and guiding a structure for low friction linear movement along a linear path.

BACKGROUND OF THE INVENTION

There is often a need for a low friction bearing support for a heavy structure to be moved along a linear path. There has heretofore been developed various linear way bearings such as recirculating roller bearings interposed between flat surfaces.

Such bearings, while providing precision guided motion, are relatively costly and generate significant friction. Similarly, there has been provided recirculated ball bearings guided on shafts, but shaft bearings cannot resist turning forces such as are exerted by a cantilevered structure. Where a structure is to be moved manually, such as production tools or other equipment manipulated by production line workers, significant friction is a disadvantage because of the manual effort required to overcome the friction, particularly where repetitive motions are required.

There has also heretofore been developed extremely low friction air bearings for guided movement which are particularly suited to applications in which manual effort is to be minimized, but require a filtered air supply and again such air bearings are relatively costly and not well suited to the rugged environment of production operations.

Accordingly, it is an object of the present invention to provide a rugged, but very low friction guideway arrangement which can be fabricated at relatively low cost.

SUMMARY OF THE INVENTION

The present invention comprises a guideway arrangement consisting of a parallel upper and a separate lower guide bar extending parallel to each other on which are supported upper and lower roller sets. Each roller set is comprised of two pairs of rollers angled towards each other to engage opposite surfaces on the guide bar on which the roller set runs. The two roller pairs in the upper set run on upper surfaces of the guide bar with the rollers in the lower set running on under surfaces of the lower guide bar.

The upper and lower roller sets are mounted on a common U-shaped holder member with the lower roller set being adjustably mounted to allow for adjustment of the engagement pressure exerted by the upper and lower roller sets on the guide bars.

The upper and lower guide bars are preferably held in a precisely controlled, spaced apart relationship by a series of pairs of spacer blade pieces having opposite ends cut out to receive the respective oppositely facing contours of the guide bars. The locator blade pieces are received in slots in a mounting channel member with threaded elements passing through the channel member and into the guide bar located between each pair of spacer blade pieces to hold each guide bar into firm seating engagement with the cut out end contour of the locator blade pieces.

In a first embodiment, round shafting is used for the guide bars and the threaded fastener comprises screws received into threaded bores in the round shafting.

In a second embodiment, square tube shafting guide is used for the bars and the threaded fasteners include wing screws received into and rotated, with a projecting threaded stem being secured by means of an engaging nut to pull the square tube guide bar against the end contour of the locator blade pieces.

DESCRIPTION OF THE DRAWINGS

FIG. 1 is a fragmentary perspective view of a linear guideway arrangement according to the present invention.

FIG. 3 is a lengthwise section taken along the lines 3—3 in FIG. 2.

DETAILED DESCRIPTION

Figure 2:
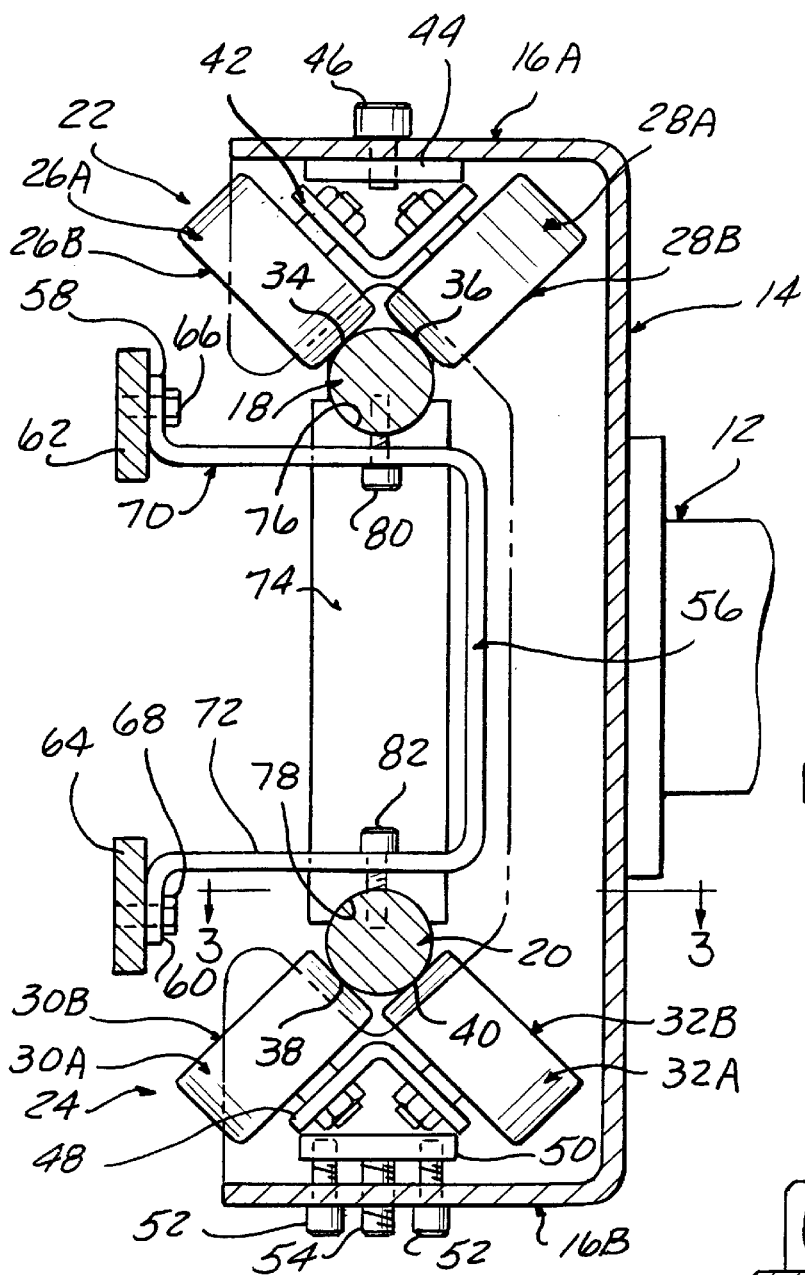
FIG. 2 is a transverse sectional view of the section taken through the linear guideway arrangement shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The linear guideway arrangement 10 according to the present invention provides for low friction linear movement along a linear axis Y of a supported structure such as a cantilevered tool support arm 12, one end shown in fragmentary form.

Such cantilevered arms often involve relatively large weights which are overhung a substantial distance from the point of support, and accordingly, relatively high pressures are exerted on the guideway, which must be sustained by the bearing support provided.

Such pressure is easily sustained by the guideway arrangement 10 according to the present invention, while at the same time, generating only very slight frictional forces.

The guideway arrangement includes a U-shaped holder member 14 to which the supported structure 12 is fixed. The holder member 14 includes a pair of opposite legs 16A, 16B which straddle an upper guide bar 18 and a separate lower guide bar 20 spaced apart vertically, but mounted to extend parallel to each other.

Upper leg 16A of the holder member 14 supports upper roller set 22, and lowerleg 16B supports lower roller set 24. Upper roller set 22 engages and runs along opposite top surfaces of upper guide bar 18, while lower roller set 24 engages and runs along lower opposite surfaces of lower guide bar 20.

Upper roller set 22 is comprised of spaced apart pairs of rollers 26A, 28A, 26B, 28B and lower roller set 24 is comprised of linearly spaced pairs of rollers 30A, 32A, 30B, 32B. Each roller 26A, 28A, 26B, 28B, 30A, 32A, 30B, 32B is inclined and mounted for rotation about axes angled towards each other such as to position the roller perimeter in engagement with a respective upper guide bar 18 or lower guide bar 20 on opposing surfaces 34, 36 on the upper guide bar 18 on the upper surface of the upper guide bar 18 or opposing surfaces 38, 40 on the lower surface of the lower guide bar 20.

Each of the rollers are preferably comprised of commercially available cam followers, constructed of nylon or steel outer cylinders supported on ball or roller bearings.

Thus, the upper roller set 22 and the lower roller set 24 provide linear guidance for the movement of the holder piece 14 along the upper and lower guide bars 18, 20, as well as support for the weight of the holder member 14 and supported structure 12.

The upper roller set 22 is supported on an angle piece 42 welded to a plate 44 in turn secured to the upper leg 16A of holder member 14 by means of cap screws 46.

The lower roller set 24 is supported on an angle piece 48 welded to a plate 50 which is secured to the bottom leg 16B in the holder member 14 by means of pairs of cap screws 52.

Allen screws 54 are also provided which allow an up and down adjustment for the lower roller set 24 such as to enable adjustment of the distance between the upper and lower roller sets 22, 24 in order to eliminate looseness and insure proper engagement pressure of the rollers with the upper and lower guide bars 18, 20.

The upper and lower guide bars 18, 20 comprise solid round shafts in the embodiment shown in FIGS. 1 and 2 and are supported on a support channel 56 having flange edges 58, 60 secured to a supporting rails 62, 64 of a fixed structure by means of bolts 66, 68.

The support channel member 56 has upper and lower legs 70, 72, which are slotted to form openings to receive a series of pairs of blade locator pieces 74 which protrude through the sidewalls 70, 72 through the slots such as to position contoured ends 76, 78 above the upper leg 70 and below the lower leg 72 of the channel support member 56.

The locator blade pieces 74 are preferably stampings punched or cut from sheet steel material with the end contours 76, 78 accurately cut therein such as to mate precisely with the upper guide bar 18 and lower guide bar 20 and thereby establish a precise spacing and alignment of the upper and lower guides 18, 20 without the need for precision machining of the length of the guide bars 18, 20.

The shafting used for the upper and lower guide bars 18, 20 is commercially available for use for conventional linear shaft bearings and is suitable for this purpose. The upper and lower guide bars 18, 20 are drawn tightly against the end contour 76, 78 of the locator pieces 74 by means of cap screws 80, 82 received through holes in the upper and lower legs 70, 72 of the support channel 56 and threadably engaging aligned bores in the upper and lower guide bars 18, 20, respectively.

The cap screws 80, 82 are located between pairs of the locator blade pieces 74. At the same time, the locator blade pieces 74 are thereby secured to the support channel 56. Thus, it can be appreciated that a relatively low cost manufacture of the holder arrangement is enabled yet providing quite precise structure for guiding the roller sets along the linear axis Y.

Figure 4:
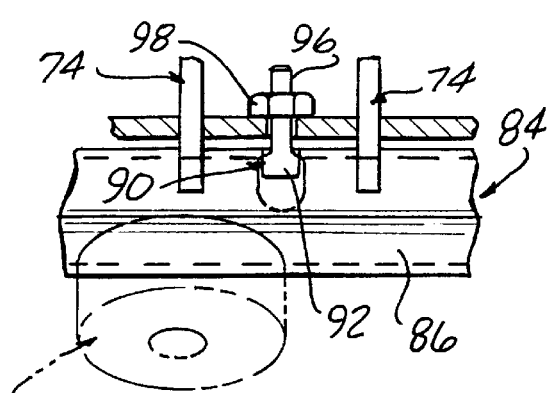
FIG. 4 is a fragmentary front view of a mounting detail of a second embodiment of the linear guideway arrangement according to the present invention utilizing square tube guide bar with an alternate threaded fastener arrangement for securing the square tube guide bar in a located position.
Figure 5:
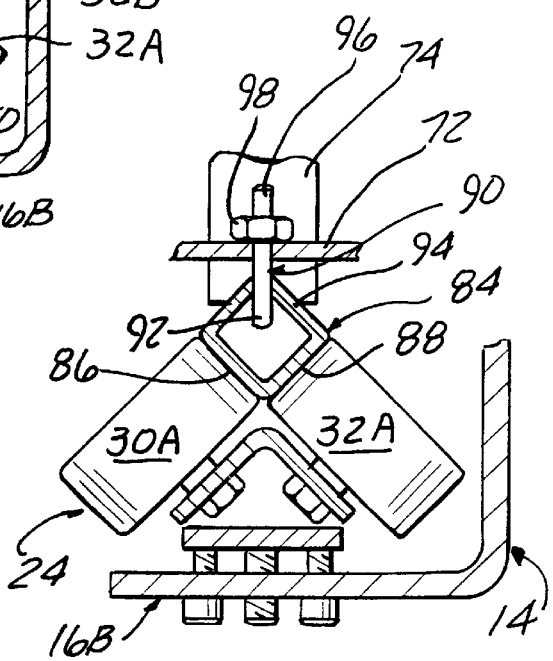
FIG. 5 is a fragmentary view of a transverse section taken through an alternate embodiment of the linear guideway arrangement according to the invention utilizing a square tube guide bar as shown in FIG. 4.

As an alternative to the round or cylindrical shafting used for the upper and lower guideways 18, 20, separate hollow square lengths of tube shafts can be utilized as shown in FIGS. 4, 5, cold rolled, steel tubing being suitable for this purpose.

In this instance, the rollers in each of the upper and lower roller sets 22, 24 engage side faces of the square tubing 84. The lower guide bar 84 is illustrated in FIGS. 4, 5.

The fastener elements in this instance are preferably comprised of wing screws 90, each having a broadened head 92 which can be turned to pass through a transverse slot 94 in the square tubing 84, and thence rotated to the position shown in FIG. 4 to provide an anchoring within the interior of tube 84.

A threaded end 96 protrudes upwardly through the leg 72 so as to be able to receive a nut 98 for tightening and drawing the tube 84 against the end contour 78 of the locator piece 74 in similar fashion to the design shown in FIGS. 1 through 3.

The widely spaced rollers in the upper and lower roller sets 22, 24 afford good leverage to resist the relatively great pressures resulting from the cantilevered mounting of the supported structure 12. The arrangement of the upper and lower spaced guide bars is constructed at relatively low cost and yet providing precise guidance surfaces insuring relatively low friction in the system and thus well suited to provide low friction guideways for equipment used in manual operations.

We claim:

1. A linear guideway arrangement comprising:

an elongated upper guide bar comprised of a shaft having a contoured upper guide surface extending along the length thereof;

an elongated lower guide bar, spaced below and extending parallel to said upper guide bar, said lower guide bar comprised of a separate shaft having a lower contoured guide surface extending along the length thereof;

an elongated support member supporting said separate upper and lower guide bars held spaced apart but extending parallel to each other;

an upper set of roller assemblies each roller assembly in said upper set including a pair of roller surfaces angled towards each other;

said upper set resting on and running along said contoured guide surface of said upper guide bar;

a lower set of roller assemblies spaced below said upper set of roller assemblies, each roller assembly in said lower set including a pair of roller surfaces angled towards each others and resting on and running along said lower contoured guide surface of said lower guide bar; and, a holder member having each of said sets of upper and lower roller assemblies mounted thereon spaced apart to receive said upper and lower guide bars; and, a series of guide bar locator pieces supported by said support member, each locator piece having opposite ends, each end abutting a respective upper or lower guide bar, and attachment means for drawing and holding said respective upper and lower guide bars in abutment against said respective end thereof to be held spaced apart by the length of said locator pieces.

2. The guideway arrangement according to claim 1 wherein said locator pieces comprise flat metal pieces each having opposite ends contoured to receive a lower side of said upper guide bar and an upper side of said lower guide bar.

3. The guideway arrangement according to claim 2 wherein said support member comprises a channel formed in part by a pair of sidewalls, said sidewalls slotted to receive said locator pieces.

4. The guideway arrangement according to claim 1 wherein said support member has upper and lower sidewalls, and said locator pieces extend through openings in said upper and lower sidewalls, and wherein said attachment means includes a series of fastener elements interposed between said locator pieces, each element extending through an opening in a respective sidewall to engage an upper or lower guide bar.

5. The guideway arrangement according to claim 4 wherein each of said upper and lower guide bars is cylindrical, and wherein said fastener elements comprise threaded screws threadably received in bores in said upper and lower guide bars.

6. The guideway arrangement according to claim 4 wherein said upper and lower guide bars comprise separate square tubes.

7. The guideway arrangement according to claim 6 wherein said fastener elements comprise threaded pins each having a widened head received through a respective transverse slot in said square tubes, said widened head turned to be held therein, and a threaded stem received in a respective support member sidewall, with a nut threaded thereon to draw said upper and lower guide bars into abutment with said locator piece opposite ends.

8. The guideway arrangement according to claim 1 wherein said series of locator pieces are disposed in juxtaposed pairs arranged along the length of said upper and lower guide bars.

9. The guideway arrangement according to claim 1 wherein two roller assemblies are included in each of said upper and lower roller assembly sets, each pair of roller surfaces angled towards each other to engage the respective contoured guide surfaces spaced linearly from the other along the length of said upper and lower guide bars.

10. The guideway arrangement according to claim 9 wherein said holder member is U-shaped, formed by a pair of legs, each leg of said U-shaped member holding a respective roller set.

11. The guideway arrangement according to claim 10 wherein said upper and lower roller assembly sets are mounted to respective upper and lower angle pieces, each roller in each of said sets of roller assemblies mounted to a leg of a respective angle piece, said upper and lower angle piece legs diverging past said opposing sides of said upper and lower guide bars respectively, said angle pieces attached to a respective leg of said holder member.

12. The guideway arrangement according to claim 11 wherein said lower angle piece is adjustably mounted to one of said legs of said holder member to enable adjustment of an engagement pressure exerted by said rollers.

* * * * *

UNITED STATES PATENT AND TRADEMARK OFFICE
CERTIFICATE OF CORRECTION

PATENT NO. : 5,915,840
DATED : June 29, 1999
INVENTOR(S) : James Zaguroli, Jr.; James M. Weitz; and James L. Daubert It is certified that error appears in the above-indentified patent and that said Letters Patent is hereby corrected as shown below:

Column 1, line 38, delete "a parallel" insert therefor --an--.

Column 1, line 63, after "bars" insert --,--.

Column 1, line 65, delete "guide".

Column 1, line 66, after "for the" insert --guide--.

Column 1, line 67, after "into" insert --slots--.

Column 2, lines 63-64, delete "or lower guide bar 20".

Column 2, lines 64-65, delete "on the upper guide bar 18".

Column 3, line 25, delete "a" after secured to.

Column 3, line 57, after "separate" insert --lengths of--.

UNITED STATES PATENT AND TRADEMARK OFFICE
CERTIFICATE OF CORRECTION

PATENT NO. : 5,915,840
DATED : June 29, 1999
INVENTOR(S) : James Zaguroli, Jr.; James M. Weitz; and James L. Daubert It is certified that error appears in the above-indentified patent and that said Letters Patent is hereby corrected as shown below:

Column 3, line 58, delete "lengths of".

Column 4, line 32, after "assemblies" insert --,--.

Column 4, line 39, delete "others" insert therefor --other,--.

Signed and Sealed this

Ninth Day of May, 2000

Q. TODD DICKINSON

Attest:

Attesting Officer

Director of Patents and Trademarks